A. E. FAUROT.
DETACHABLE END GATE.
APPLICATION FILED MAR. 23, 1915.
1,186,762. Patented June 13, 1916.
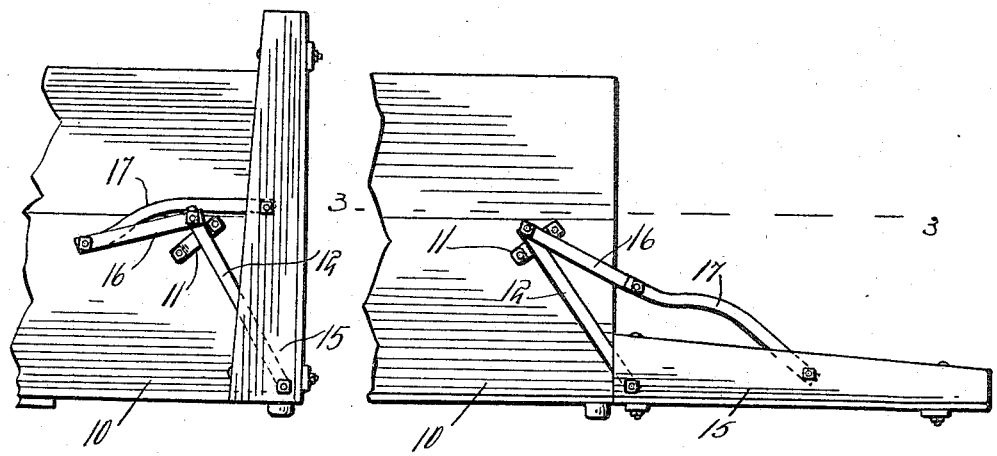
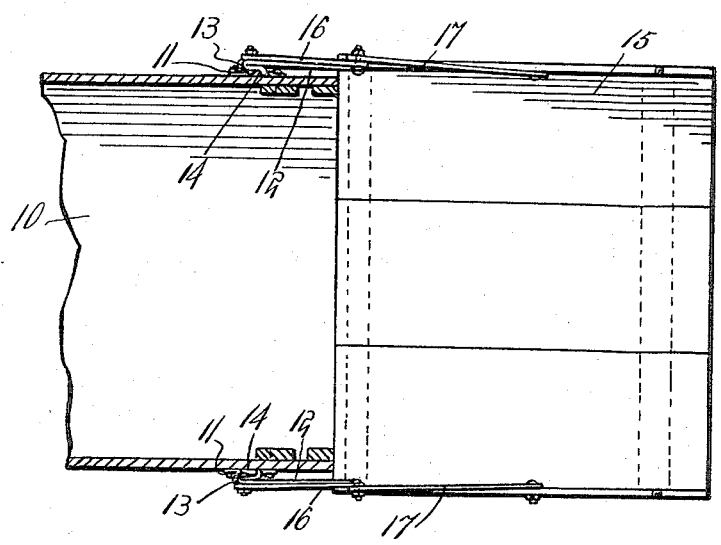
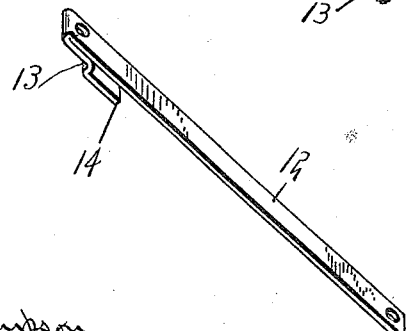
Inventor
A. E. Faurot

UNITED STATES PATENT OFFICE.

ALVA E. FAUROT, OF LAMAR, MISSOURI.

DETACHABLE END-GATE.

1,186,762. Specification of Letters Patent. Patented June 13, 1916.

Application filed March 23, 1915. Serial No. 16,366.

*To all whom it may concern:*

Be it known that I, ALVA E. FAUROT, a citizen of the United States, residing at Lamar, in the county of Barton, State of Missouri, have invented certain new and useful Improvements in Detachable End-Gates; and I do hereby declare the following to be a full, clear, and exact description of the invention, such as will enable others skilled in the art to which it appertains to make and use the same.

This invention relates to improvements in wagons and particularly to end gates therefor.

The principal object of the invention is to provide an end gate which can be quickly and easily attached to or detached from the end of a wagon box.

Another object is to provide a double end gate which is capable of vertical pivotal movement on the wagon box.

Another object is to provide a novel means for suspending the gate in horizontal or open position, said means also operating to hold the gate in closed position.

Other objects and advantages will be apparent from the following description when taken in connection with the accompanying drawing.

In the drawing: Figure 1 is a side elevation of the rear portion of a wagon box showing my gate applied thereto and in closed position, Fig. 2 is a side elevation showing the gate in open position, Fig. 3 is a horizontal sectional view on the line 3—3 of Fig. 2, looking downward, and Fig. 4 is a perspective view of the detachable supporting link.

Referring particularly to the accompanying drawing, 10 represents the box of a wagon on each side of the rear of which are secured the loop straps 11, a link 12 having its upper end doubled on itself as at 13 and then the end bent so as to lie in offset parallel relation to the body portion of the link as at 14. There are two of these links 12, one on each side of the wagon box and these offset portions 14 are engaged with the before-mentioned loops 11. Pivotally connected to the lower ends of the links is an end gate 15. Pivotally connected to the upper end of each of the links 12 is a link 16 which has its other end pivotally connected to the inner end of a slightly curved link 17 pivotally connected to the side of the gate 15. The curve of the links 17 is such that the pivotal connection between these links and the links 16 will pass below the pivotal connections between the links 16 and 12 when the gate is in closed position, as clearly shown in Fig. 1, whereby the gate is held from swinging into open or lowered position. It will be noted that the links 12 support the inner end of the gate and permit the same to swing thereon in the opening and closing movement. The links 16 and 17 serve to support the gate in a horizontal position, as shown in Fig. 2.

When it is desired to remove the gate from the wagon box, the gate is moved vertically from its closed position so as to disengage the offset portions 14 from the loops 11. The gate can then be entirely removed from the wagon.

What is claimed is:

The combination with a wagon box and end gate, of a pair of loops mounted on opposite sides of the rear end of the box, a pair of links pivotally supporting the inner end of the gate and bent upon themselves and terminating in parallel offset spaced portions for sliding engagement in the said loops, and links pivotally connected together and respectively to the upper ends of the supporting links and to the end gate, one pair of said links being curved to permit the pivotal connection between them and the attached links to pass below the upper pivotal connection of the supporting links when the gate is in closed position.

In testimony whereof, I affix my signature, in the presence of two witnesses.

ALVA E. FAUROT.

Witnesses:
 DOUGLAS INGLISH,
 H. G. INGLISH.